United States Patent [19]

Avery

[11] 4,307,657
[45] Dec. 29, 1981

[54] POPCORN POPPING AND VENDING MACHINE

[76] Inventor: Richard D. Avery, 2740 NE 23rd St., Pompano Beach, Fla. 33062

[21] Appl. No.: 162,486

[22] Filed: Jun. 24, 1980

Related U.S. Application Data

[63] Continuation-in-part of Ser. No. 949,995, Oct. 10, 1978, abandoned.

[51] Int. Cl.³ ............................................... A23E 1/18
[52] U.S. Cl. .................................. 99/323.7; 99/323.8; 99/323.9
[58] Field of Search ............... 99/323.5, 323.8, 323.6, 99/323.7, 323.9; 222/146 HE

[56] References Cited

U.S. PATENT DOCUMENTS

| | | | |
|---|---|---|---|
| 904,186 | 11/1908 | Eckstein | 99/323.11 |
| 2,630,058 | 3/1953 | Hawks | 99/323.11 |
| 2,922,355 | 1/1960 | Green | 99/323.11 |
| 3,323,440 | 6/1967 | Grant | 99/323.5 |
| 3,512,989 | 5/1970 | Smith | 99/323.8 |
| 3,665,839 | 5/1972 | Gottlieb | 99/323.5 |
| 3,886,855 | 6/1975 | Nara | 99/323.11 |

*Primary Examiner*—Robert W. Jenkins
*Attorney, Agent, or Firm*—Malin & Haley

[57] ABSTRACT

A manually actuated popcorn machine which heats, pops kernels of corn, and delivers a specified amount of popped corn to a waiting container in a short time. The popcorn machine includes a recirculating hot air conduit with an air blower portion, heating chamber portion, popping chamber portion for the kernels, a separating chamber portion, and a system of control baffles throughout the chambers for controlling the flow of air and popcorn. The conduits include a continuous main chamber and a spur conduit that leads to a cup dispensing chamber for placing the popped corn in a cup for distribution. When actuated, the popcorn machine delivers a set amount of stored kernels to a screened grid in the popping chamber, the air from the blower moves past the heating element and through the screened grid to work around the kernels and to keep the kernels in motion on and above the screen grid and to move the popped corn away from the screened grid and into a cup. When the hot air and the kernels reach a proper temperature, the kernels are popped and the volume and density are radically changed. The air, whose currents are controlled by baffles, delivers the more buoyant popped corn up and into the spur conduit for delivery to a container while the hot air is recycled into the blower.

7 Claims, 11 Drawing Figures

POPCORN POPPING AND VENDING MACHINE

CROSS-REFERENCES TO OTHER APPLICATIONS

This application is a continuation-in-part of a prior application Ser. No. 949,995 filed Oct. 10, 1978, now abandoned.

BACKGROUND OF THE INVENTION

This invention relates to popcorn machines, using heated air to cook the popcorn, and more particularly to a popcorn machine which uses a system of baffles in a continuous conduit to control the movement of both the cooked and uncooked kernels and to control the velocity of the heated air.

The prior art reveals a variety of popcorn vending machines which use heated air to effectuate cooking of the popcorn. Prior art devices are shown in U.S. Pat. Nos. 904,186 and 2,922,355. By way of example is U.S. Pat. No. 2,922,355 in which a corn popping apparatus is described. This device comprises a series of end to end tubular sections having larger diameters in the upward direction in which the popcorn is cooked. By varying the diameters of the different tubular sections the velocity of the hot air is controlled to both suspend the uncooked kernels in the lower section and allow the cooked kernels to be transported to a receiving area. However, this device uses only the diameters of the different tubes to control the velocity of the hot air.

The present invention employs a system of baffles within the various chambers of the continuous conduit to control both the direction and velocity of the heated air and the movement of the cooked and uncooked kernels in the prescribed portions of the conduit. The electrical control system combined with the mechanical structure provide a versatile popcorn popping and vending machine.

BRIEF SUMMARY OF THE INVENTION

According to the present invention, the popcorn machine or device comprises an outer rectangularly shaped body having contained therein a main continuous recirculating air conduit with an air blower in one portion, an electrical heating element in a second portion downstream of the air blower, a popping chamber portion downstream of the heating source with a grid support for holding the kernels, a separating chamber portion leading back to the air blower, baffles in the separating chamber to control the turbulant air flow, and a spur conduit or portion adjacent the inlet to the blower leading to the dispensing area.

The continuous recirculating air conduit also contains a plurality of control baffles. A first baffle is connected to the conduit between the heating chamber portion and the popping chamber portion in order to control the velocity of the heated air before it reaches the gridded support. A second baffle is connected to the screen grid which supports the uncooked kernels and is used to control the movement of the popcorn. A third baffle is connected to the conduit within the popping chamber portion above the second baffle in order to cause turbulence of the air to effectuate movement of the popcorn and also to retain the uncooked kernels from being blown into the separating chamber portion. A fourth baffle is connected to the conduit above the third baffle in the popping chamber portion in order to control the velocity of the heated air and to prevent unpopped kernels from being blown into the separating chamber portion.

A container for the kernels of corn and a means of dispensing a particular quantity of kernels from the container into the popping chamber are connected adjacent the popping chamber. The kernels are dispensed to a movable screen grid on which the kernels are popped. At the distal end of the spur conduit is the dispensing chamber for receiving and dispensing the popped corn into a cup. The dispensing chamber includes a cup area and an access door. The popcorn machine may include a cup dispenser. The device may also include a second dispensing means positioned below the screen grid to receive dispensed unpopped kernels that may be left on the screen grid, if any.

A coin switch means or manual switch control is used to start up the popcorn machine. Three solid state timing units are used to control the operation of all the components including the blower, heater and dispensers.

Additional features may be included to dispense melted butter, cheeses, salt and other seasonings onto the popped corn after it is placed in a cup.

In use, a controlled velocity and volume of air is moved out of the blower after the switch is activated. The temperature, velocity, and direction of the air flow is critical to the efficient operation of the machine. The air is moved over the heating elements in the heating chamber. The shape of the main conduit and the size of the blower controls the volume and velocity of the air along with the baffles and heating elements. The design provides the maximum amount of heat from the smallest and most economical heat source. When the circulating air has risen to the proper heat level as it passes through the heat chamber containing the heating elements, it is metered properly in a controlled volume and velocity of air into and through the popping chamber. In the popping chamber the raw kernels are dispensed and then supported on a screen grid. The hot air passes through the screen grid to move the kernels during the heating process to prevent burning and drying of the unpopped kernels. The proper air temperature pops the kernels to their fullest volume. The moving air then moves the popped or exploded kernels upward. The proper air velocity and air direction, as controlled by the baffle system, is maintained to insure that the popped kernels go over a barrier means to reach the separating chamber portion. The barrier prevents undesirable unpopped kernels or old maids or partially popped kernels from reaching the separating chamber portion.

The device may be actuated by inserting a coin to actuate a start switch or by a conveniently placed manual start switch. Activation of the switch engages the main timing element for a given adjustable time which controls the overall operation of the machine. The main adjustable time activates a second adjustable timer for a given adjustable time which controls the kernel or raw corn dispensing means. The dispensing means includes a motor that drives a spring worm delivery mechanism located at the bottom of the kernel bin. The spring worm delivers the correct amount of kernels to the popping grid. The second timer assures that the dispensing means will automatically stop after the preselected time to provide the proper amount of kernels of raw corn to the popping chamber. Simultaneously, the main timer activates the blower and the heating element for a preselected time and may dispense a cup to a collection point at the distal end of the spur conduit. The blower forces air past the heating element and up through a popping grid on which the raw corn has been placed. The hot air heats the kernels which then pop and thus become larger in volume. The fluffy popcorn is then separated from the unpopped kernels and the fluffy popcorn is blown from the popping chamber over the separating means. The air is recirculated by passing through the inlet into the blower. The popped corn then drops by gravity and momentum into the spur conduit into the cup for dispensing. The freshly popped corn in the cup may then be removed from the popcorn machine. The main timer then completes its cycle after the preselected time and shuts off the heating element and then the blower and then automatically activates a third timer. The third adjustable timer now activates the seasoning dispensor for a preselected time which dispenses the pre-selected seasonings onto the popcorn in the cup. The third timer also activates the door releases and dumps the new popped corn into the cup and dumps the screen grid to discharge the leftover kernel or old maid, if any, into a separate container. The screen grid is lowered in the popping chamber so that the unpopped kernels fall by gravity from the popping grid and then the popping grid is returned to its original position ready for the next cycle.

In accordance with the above described structure and operation, it is an object to provide such a device that uses air orifices and baffels throughout the entire air conduit to provide proper cooking control.

Another object of this invention is to deliver a specified amount of popped corn in the least amount of time, and in so doing deliver to the customer the highest quality fresh product at the most economical cost to the operator, and with the minimal service time required.

Yet another object of this invention is to provide a popcorn machine which is completely automatic and includes a self-cleaning popping chamber.

Yet, another object of this invention is to provide such a device which will deliver fresh popcorn in seconds.

Still another object of this invention is to provide such a device which can add a variety of different flavorings to air popped popcorn.

Still another object is to provide such a device which is dependable, durable, and requires little maintenance.

Still another object is to provide such a device which may be easily and economically manufactured.

Still another object of this invention is to provide an accurate solid state popcorn machine with temperature sensing and control means.

Still another object of this invention is to provide an air cooking popcorn machine providing proper and precise control of temperature, proper and precise control of air velocity and volume, of non-complex design that is economical to operate, compact in size with adjustable metered portion control, self-cleaning popper mechanism, minimum input to obtain maximum popcorn volume in order to obtain a fresh product easily and quickly with minimum maintenance.

These together with other objects and advantages will become apparent to those skilled in the art upon reading the details of construction and operation as more fully set forth hereinafter, reference being had to the accompanying drawings forming a part hereof, wherein like numerals refer to like parts throughout.

DESCRIPTION OF THE PREFERRED EMBODIMENTS

Before the present popcorn vending machine is specifically described, it is to be understood that the invention is not limited to the particular arrangement of the parts hereshown, as such devices may vary. It is also to be understood that the phraseology or terminology herein used is for the purposes of description of particular embodiments and not of limitation, as the scope of the present invention is denoted by the appended claims.

Figure 1:
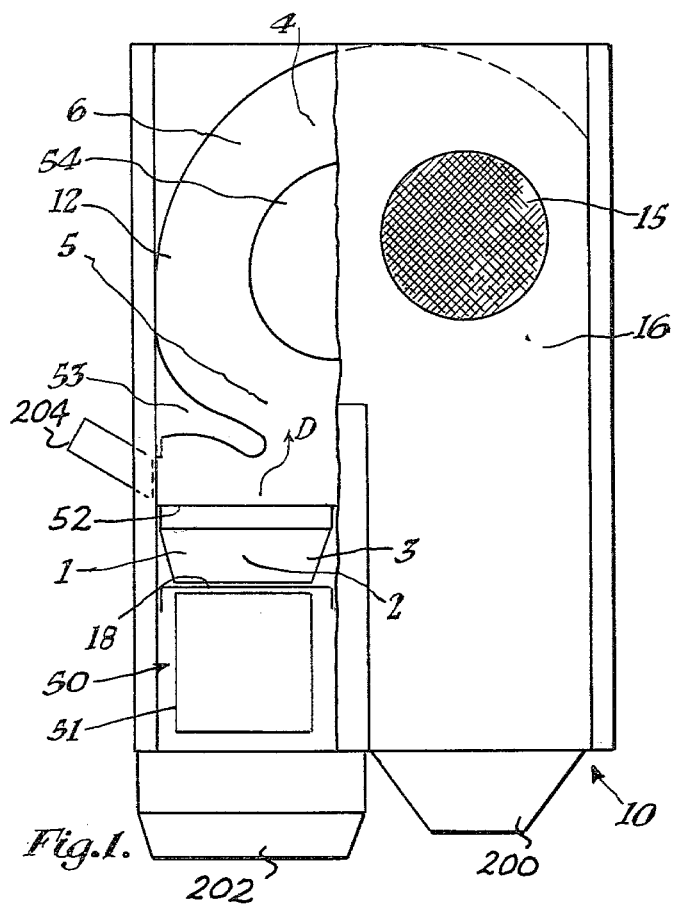
FIG. 1 is a front view of the preferred embodiment with the front wall in partial showing the baffle system.

Referring now to FIG. 1, the baffel system 50 is shown. The dimensions of the system 50 which controls the direction and velocity of the hot air flowing through the system are important to the efficient operation of the machine 10. The air leaves the heat element chamber 21' (FIG. 3) via baffel 51 having a 4.921 square inch opening and enters through the grid 18 having a 3.28 square inch opening. The baffels 51 and 52 aid in creating movement of the raw corn on grid 18. Air flows in the direction of arrows D. The baffel 53 (FIG. 11) aids in keeping the partially popped and unpopped corn kernels from being blown into the delivery area and baffel 54 further aids in achieving this purpose. The baffel 54 restricts the chamber area to a minimum cross-sectional area of 3.75 square inches. The griding 18 to 10×10 mesh with a 0.025 inch wire diameter of inconel. Just downstream of the grid 18 is baffel 52 that keeps the unpopped corn in the main air stream on the grid 18. The blower 20 has a 0.78 amp motor which is powered by 120 V and turns 3000 RPM's. The air blower or blower 20 provides 100 cubic feet of air per minute. The return air opening 15 is 8.345 square inches in size. The volume of the blower wheel chamber 20a (FIG. 2) is 50.4 cubic inches. The volume of the heat element chamber 21' is 51 cubic inches and the heater coils 22 are 13.5 amps. The volume of the popping chamber 12 is 45 cubic inches. The area of the blower outlet not shown is 3.718 square inches.

Still referring to FIG. 1, the Peter tube reading in inches of water in area 1, which is 0.625 inches inwardly displaced from the inside of the left wall and approximately 0.25 inches above the popper grid, is 0.17, the readings being taken without any popcorn presently in the popping chamber portion. At 72 degrees fahrenheit the heated air velocity in area 1 is 27.3 feet per second; or 1640 feet per minute, with an average velocity of 1476 feet per minute with a velocity of 35.4 cubic feet per minute; at 300 degrees fahrenheit the velocity is 30.8 feet per second or 1850 feet per minute which is 44.4 cubic feet per minute; at 400 degrees fahrenheit the wind velocity is 35.0 feet per second or 2100 feet per minute which is 50.4 cubic feet per minute.

In area 2, which is 1.625 inches horizontally displaced from the inside of the left wall and approximately 0.25 inches above the grid 18, the Peter tube reading is 0.21 inches without any popcorn present. The velocity of the air in area 2 at 72 degrees fahrenheit is 30.3 feet per second or 1820 feet per minute with an average velocity of 1638 feet per minute, which is equivalent to 39.3 cubic feet per minute; at 300 degrees fahrenheit the velocity is 33.1 feet per second or 1990 feet per minute which is 47.76 cubic feet per minute; at 400 degrees fahrenheit the velocity is 35.8 feet per second or 2150 feet per minute which is 51.6 cubic feet per minute.

In area 3, which is 2.625 inches inwardly displaced from the inside of the left wall and approximately 0.25 inches above the grid 18, the readings were about the same as those in area 1.

In area 4, which is 3.125 inches inwardly displaced from the inside of the left wall and approximately 5.75 inches above the grid 18, the Peter tube reading is 0.02 with no popcorn present in the popping chamber. The velocity of the heated air at 72 degrees fahrenheit is 9.3 feet per second, or 560 feet per minute with an average velocity of 504 feet per minute, the volume of air passing therethrough being 15.12 cubic feet per minute; at 300 degrees fahrenheit the velocity was 9.66 feet per second or 580 feet per minute with the volume of air passing therethrough at 17.4 cubic feet per minute; at 400 degrees fahrenheit the velocity is 10.3 feet per second or 620 feet per minute which is a volume of air passing therethrough of 18.6 cubic feet per minute.

In area 5, which is horizontally displaced approximately two inches from the inside of the left wall and 3.625 inches above the grid 18, the computed average velocity is 72 degrees fahrenheit is 1695 feet per minute or 38.98 cubic feet per minute passing therethrough; at 300 degrees fahrenheit the computed velocity is 33.3 feet per second or 2000 feet per minute which is 47.6 cubic feet per minute of air passing therethrough; at 400 degrees fahrenheit the computed velocity is 35.8 feet per second or 2150 feet per minute with 51.17 cubic feet per minute of air passing therethrough.

In area 6, which is displaced approximately one inch inwardly from the inside of the left wall and 5.75 inches above the grid 18, the computed average velocity at 72 degrees fahrenheit is 1638 feet per minute or 42.58 cubic feet per minute passing therethrough; at 300 degrees fahrenheit the computed velocity of 32 feet per second or 1920 feet per minute which is 49.92 cubic feet per minute of air passing therethrough; at 400 degrees fahrenheit the computed velocity is 35.0 feet per second or 2100 feet per minute with 54.6 cubic feet per minute of air passing therethrough.

In operation, the heating element 22 (FIG. 3) is preheated to 300 degrees and then to 420 degrees before the air is blown through the popcorn. This preheating period takes approximately 10 seconds. When good hybrid popcorn with a high moisture content is used the cooking time for 28.3 to 28.7 grams of kernels is approximately 60 seconds.

Figure 4:
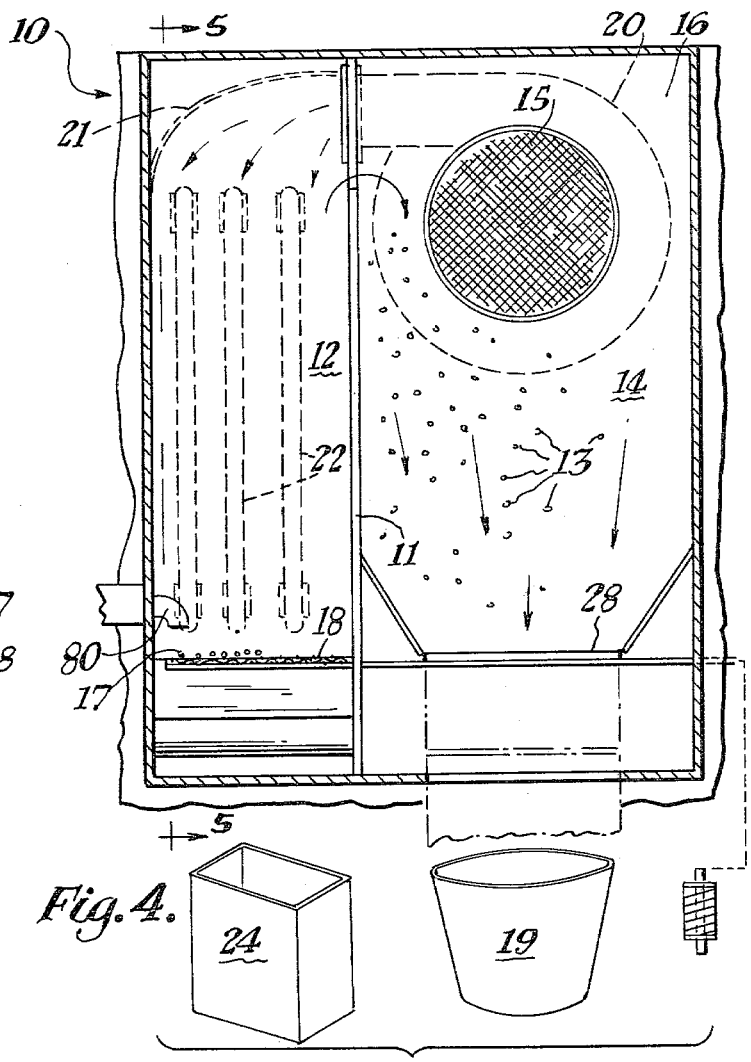
FIG. 4 is a front view of another embodiment of the popcorn machine with the front wall door in an open position with the blower shown in phantom.

Referring now to the drawings and to FIG. 4 in particular, the machine referred to generally by the numeral 10 is shown from a front view with the front wall-door (not shown) in an open position. A dividing wall 11 separates the chamber 12 where the corn will be popped from the chamber 14 where the popped corn is delivered. An air exit vent 15 is shown in the intermediate wall 16 of chamber 14. Behind the wall 16 the air blower 20 is shown in phantom. The unpopped corn 17 lies on the movable grid 18 and is moved about on the grid until it is popped. Once the corn pops, it is blown upward in the direction of arrows D until it goes over divider wall 11 and into chamber 14 where it falls into the cup 19. Air passes from the blower at a rate of 100 cubic feet per minute.

Figure 5:
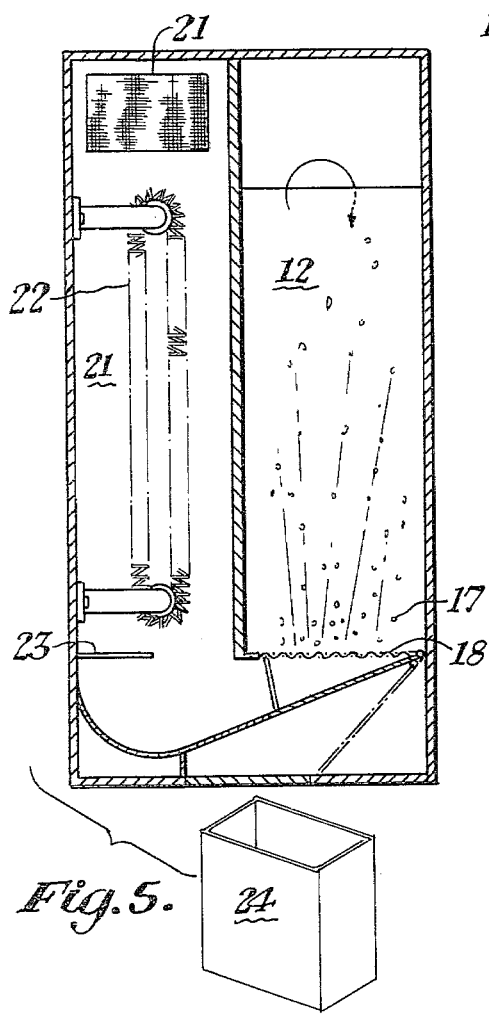
FIG. 5 is a cross-sectional side view of the machine taken along arrows 5—5 of FIG. 4 and looking in the direction of the arrows.

Referring now to FIG. 5 which is a cross-sectional side view of another embodiment of the popcorn machine taken along the arrows 3—3 in FIG. 1 and looking in the direction of the arrows. The temperature of the coils 22 and thus the air blowing by the coils is controlled by a thermostat device 23. The thermostat 23 keeps the air which flows to kernels 17 at the desired temperature in order to get the minimum number of unpopped kernels. The temperature of the heat chamber 21' is maintained between 450 degrees Fahrenheit. After all the kernels 17 have been popped, the grid 18 is tilted downward to allow any unpopped corn to fall into box 24. Once the grid 18 has been cleared of unpopped corn, the machine 10 is ready to begin another cycle. Grid 18 is connected to door 28 as shown in FIG. 7.

Figure 6:
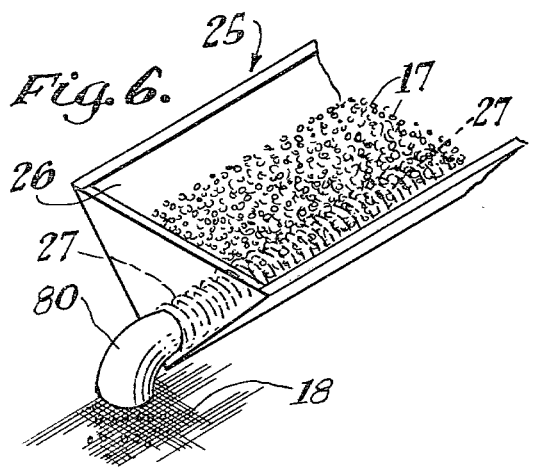
FIG. 6 is an isometric view of the kernel dispensing device.

Referring now to FIG. 6 where an isometric view of the kernel dispensing device referred to generally by the number 25 is shown. The raw corn kernels 17 are held in the trough 26 and are moved out of trough 26 when the expanded spring 27 is turned. The screw-like motion of spring 27 gradually moves the kernels 17 from the trough 26 through elbow 80 onto grid 18.

The spring 27 is driven by an electric motor (not shown). When the motor is activated, it is set to turn spring 27 a specific number of times in order to dispense a specific amount of kernels. Enough kernels are dispensed so that once popped, they will fill the container 17.

Figure 7:
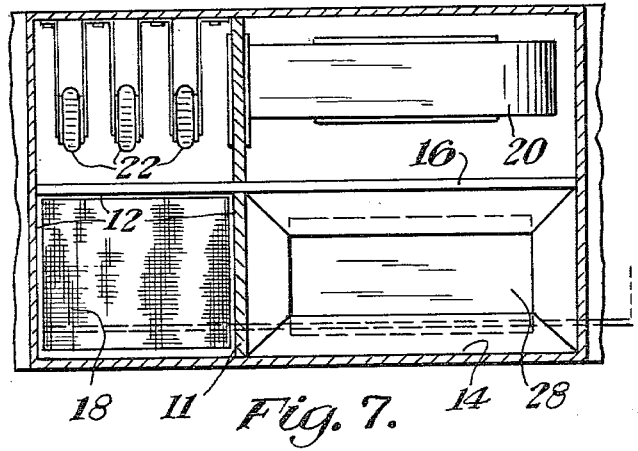
FIG. 7 is a top view of the embodiment of FIG. 4 with the top cover removed.

Referring now to FIG. 7 where the top view of the device 10 is shown with the top of the casting removed. The blower 20, which is behind wall 16, blows air downward in conduit 21. The air is heated and then directed upward into chamber 12. The rising hot air pops the corn 17 which is then blown upward over wall 11 and into chamber 14. When all the corn has been popped, a timer triggers the release of grid 18 and the trap door bottom 28 of chamber 14. The popped corn thus falls into container 19.

It should be noted that the device 10 may incorporate various dispensing means (not shown) which allow the addition of various toppings such as melted butter and/or cheeses to be dispensed on the popped corn in container 19.

Figure 9:
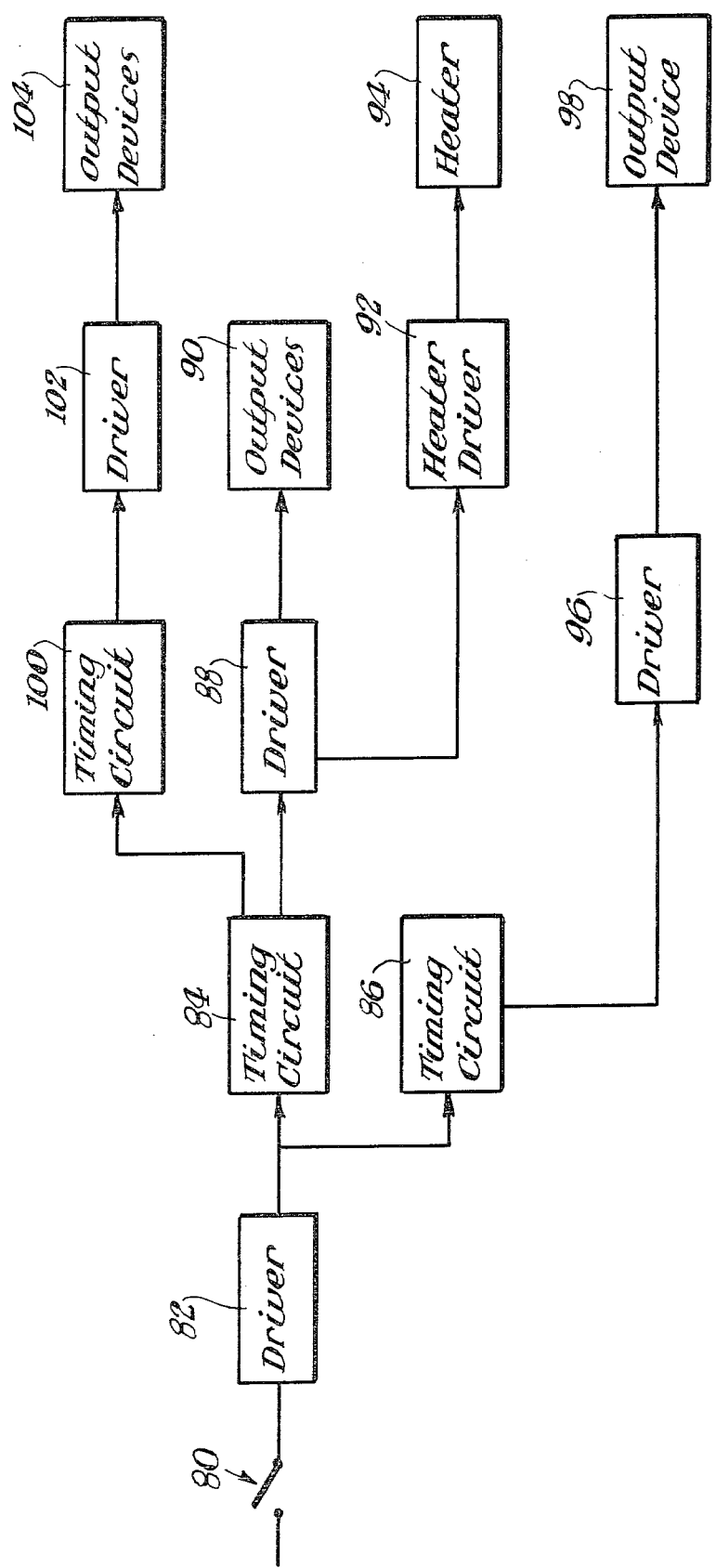
FIG. 9 is a block diagram of the electrical system of the popcorn machine.

Referring now to FIG. 9, the switch 80 is closed to begin operation of the popcorn machine. This allows the driver 82 to be energized which in turn energizes the timing circuits 84 and 86.

The timing circuit 84 energizes a second driver 88. The second drive 88 energizes a plurality of output devices 90 such as a popping indicator light and the fan motor or blower motor. The driver 88 also energizes a heater driver 92 which energizes the heater 94. It is preferred to set the timing circuit 84 to approximately 60 seconds, although other times could be used depending on the type of kernels being cooked.

The timing circuit 86 energizes the driver 96 which in turn energizes another output device 98 such as a product motor which operates the kernel dispensing device. The timing circuit 86 is set to be energized for approximately 10 seconds to provide the proper number of kernels into the popping chamber.

The timing circuit 84 also sets another timing circuit 100 which becomes active or energized as soon as the timing circuit 84 becomes deenergized. The timing circuit 100 energizes another driver 102 which in turn energizes a plurality of output devices 104 including the scrap door, tapping dispenser and the ready light.

Figure 10:
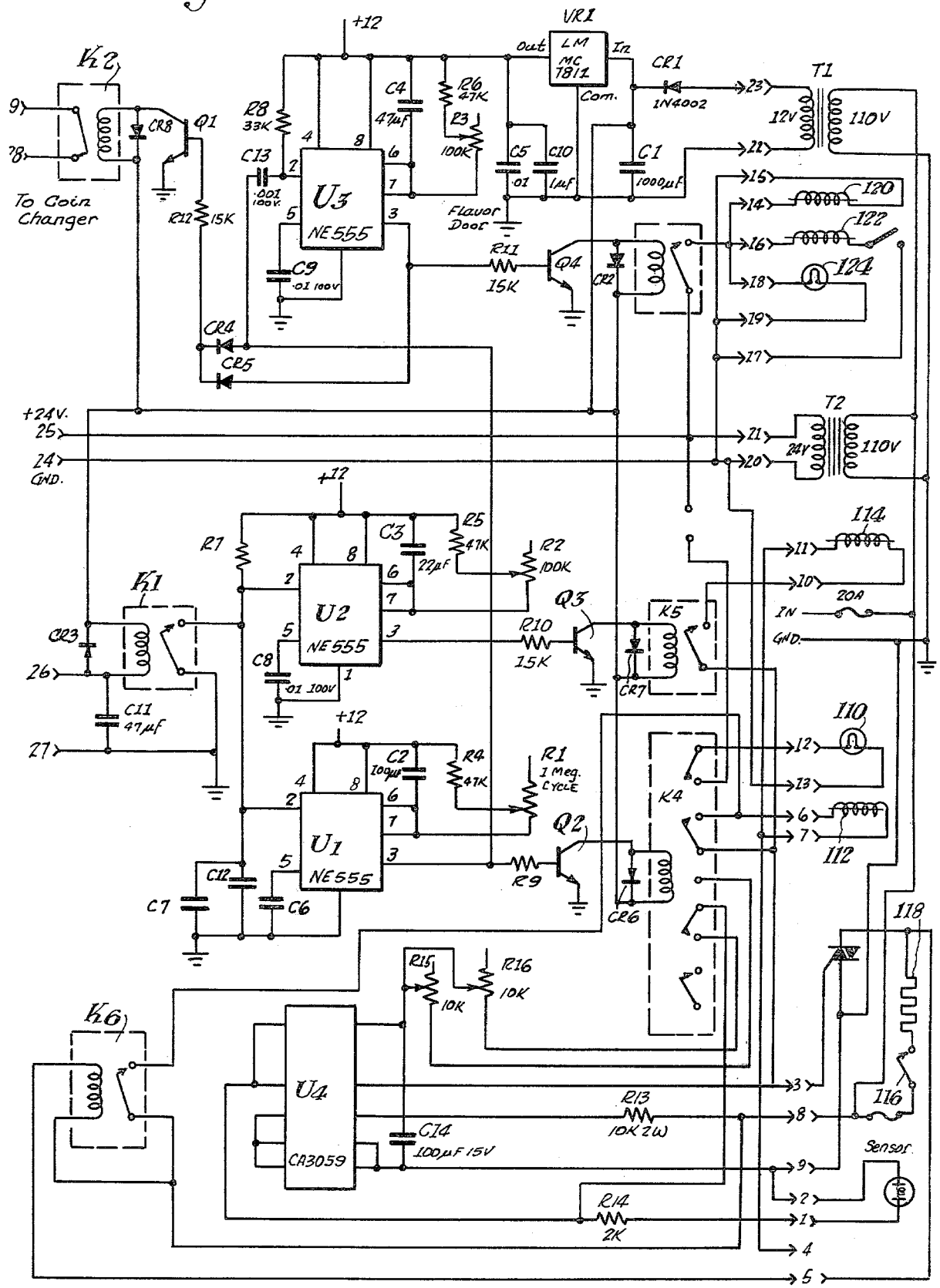
FIG. 10 is a schematic diagram of the electrical system of the popcorn machine.

Now referring to FIG. 10 a schematic diagram of the control circuitry is illustrated. When the machine is first actuated either by the insertion of a coin in the coin changer or a manual switch (not shown) for free vending the relays K1 and K2 are actuated to initiate the timers represented by the three NE555 or equivalent integrated circuits (U1, U2 and U3), two of which are connected to the relay K1 and the other one being connected to the relay K2. The first integrated circuit U1 is set for 60 seconds and when energized by the relay K1 starts the timing and also drives the transistor Q2 which controls the relay K4. The relay K4, when energized, enables the pop light 110 and the fan motor or airblower motor or winding 112 to be actuated for the duration that the first integrated circuit is set. Also when relay K1 is energized the second integrated circuit U2 also is energized. The second integrated circuit U2 is set to time for 2.5 seconds in order to regulate the amount of corn to be introduced into the popping chamber. The integrated circuit U2 drives the transistor Q3 which in turn energizes the relay K5 which energizes the product motor 114 which drives the kernel dispensing device (not shown) which actually delivers the kernels of corn to the popping chamber.

Also when relay K4 is activated, relay K6 becomes activated and the integrated circuit U4 which is a zero voltage detector also becomes energized and enables the heater 118 to be energized from the 110 volt power source. Variable resistors R15 and R16 are preset to give the respective cooking temperatures and preheat temperatures. An Elmwood sensor, or other sensing device 116 in the heating chamber measures the temperature and opens the circuit to the heater if a preselected temperature is exceeded; in this case the preselected temperature is 486° Fahrenheit. The product motor 114, fan motor 112 and heater 118 also becomes deenergized.

As soon as the first integrated circuit U1 times out, the third integrated circuit U3 becomes energized and actuates the scrap door 120 to allow removal of the unpopped kernels and the topping dispenser 122 which dispenses butter or other toppings onto the popcorn dispensed into a container below dispensing portion 200 in FIG. 1. A container such as 19 in FIG. 4 may be used. The resistor R3 is variable in order to regulate the amount of topping dispensed from the flavor pump 122. The ready light 124 also comes on when the third integrated circuit U3 is activated.

Figure 2:
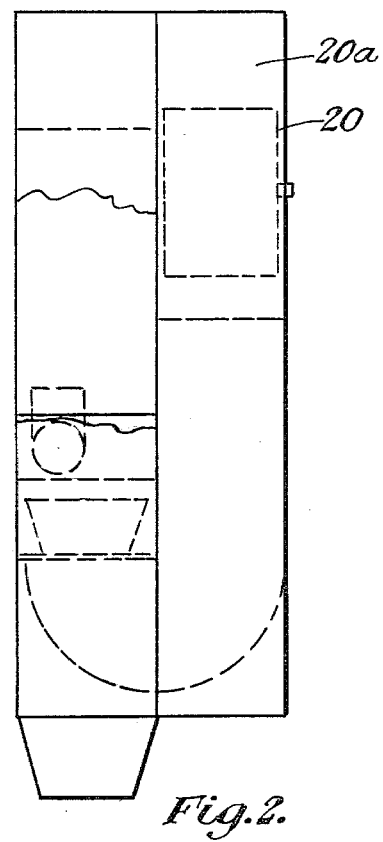
FIG. 2 is a side view of the preferred embodiment of the invention.
Figure 3:
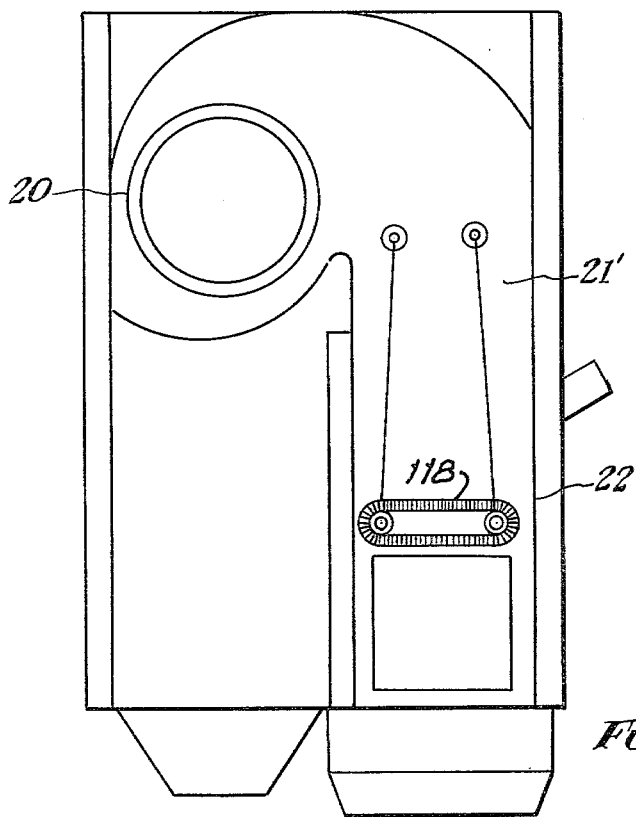
FIG. 3 is a rear view of the preferred embodiment of the invention with the rear wall removed.

The scrap door 120 in FIG. 10 is located as 202 in FIG. 1, topping dispenser 122 and ready light 124 are all energized by a 12 volt source, while the product motor 114 in FIG. 10 is located 204 in FIG. 1 and may have a spring as shown in FIG. 6, fan motor 122 in FIG. 10 is located in blower 20 as shown in FIG. 2, and the heating element 118 in FIG. 10 is located as shown in FIG. 3 are controlled by the standard 110 volt source. The pop light 110 is controlled by a 24 volt power source.

Figure 8:
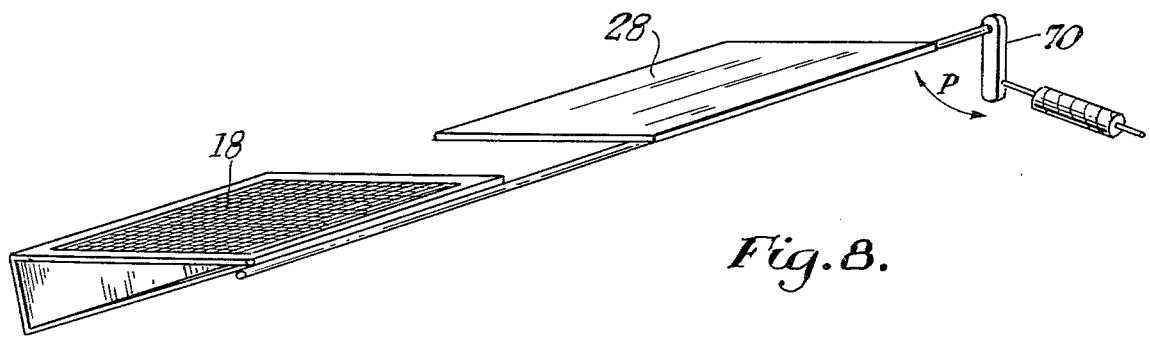
FIG. 8 is a perspective view of the moveable popping grid and trap door.

The grid 18 and trap door 28 are shown in more detail in FIG. 8. The solenoid pulls lever 70 in the direction of arrow P and the grid 18 and the door 28 are tilted downward. The unpopped corn on grid 18 falls to box 24 and the freshly popped corn falls to cup 19 as shown in FIG. 4.

Figure 11:
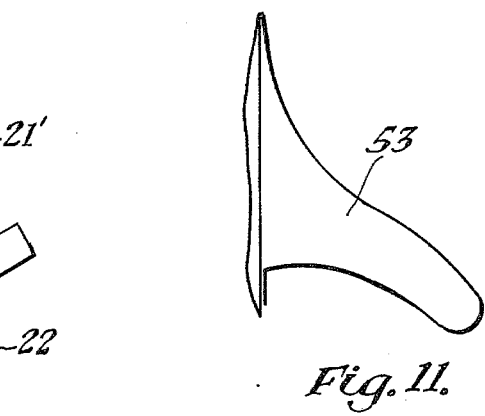
FIG. 11 is a front view of the baffle 53 in actual size showing preferred shape as shown in FIG. 1.

Referring to FIG. 11, the baffle 53 shown in actual size creates turbulence to effect the Peter tube readings as previously recited and to restrain unpopped corn from being blown to the other chambers of the machine.

The instant invention has been shown and described herein in what is considered to be the most practical and preferred embodiment. It is recognized, however, that departures may be made therefrom within the scope of the invention and that obvious modifications will occur to a person skilled in the art.

What I claim is:

1. A new and improved self-cleaning popcorn popping and vending machine connectable to a power source which produces controlled velocity heated air from an air blower and heating element to cook a predetermined number of unpopped kernels of corn, as regulated by a product motor controlled kernel dispensing device, dispense the popped popcorn, dispense a topping from a topping dispenser on the popped popcorn while unpopped kernels are disposed of, whenever said machine is actuated, comprising:

an outer casing, having at least a left wall;
   a continuous recirculating hot air conduit within said casing, said conduit having an air blower chamber, a heating chamber portion, a popping chamber portion, a separating chamber portion, and a plurality of control baffle means for controlling the velocity of said heated air and controlling the movement of the popcorn;
   a gridded support, said gridded support connected to said conduit within said popping chamber portion and having gridding of a size such that unpopped kernels of corn may not fall through;
   a control means for timing and regulating the functions of said machine.

2. An improved self-cleaning popcorn popping and vending machine as set forth in claim 1, wherein:
   said plurality of control baffle means includes a first baffle, said first baffle connected to said conduit between said heating chamber portion and said popping chamber portion and controlling the velocity of said heated air;
   a second baffle, said baffle connected to said gridded support to control movement of the popcorn;
   a third baffle, said third baffle connected to said conduit within said popping chamber portion for controlling movement of the popcorn;
   a fourth baffle, said fourth baffle connected to said conduit, a predetermined distance from said third baffle, for preventing the unpopped kernels from being blown into said separating chamber portion.

3. An improved self-cleaning popcorn popping and vending machine as set forth in claim 2, wherein:
   said first baffle is rectangular-shaped;
   said second baffle is funnel-shaped and located downstream from said first baffle;

said third baffle is an elongated member and located downstream from said second baffle;

said fourth baffle is semi-circular shaped and located downstream from said third baffle.

4. An improved self-cleaning popcorn popping and vending machine as set forth in claim 3, wherein:

said first baffle, said second baffle, said third baffle and said fourth baffle, create an average velocity of 1476 feet per minute at 72° F. of said heated air at a first point displaced 0.625 inches inwardly from the left wall of said machine and 0.25 inches above said gridded support; at a said point 2 inches inwardly from said first point and 0.25 inches above said gridded support an average velocity of 1638 feet per minute at 72° F. of heated air at a third point displaced 1 inch inwardly from said first point and 0.25 inches above said gridded support;

an average velocity of 504 feet per minute at 72° F. of said heated air at a fourth point displaced 3.125 inches inwardly from the left wall of said machine and 0.25 inches above said gridded support;

a computed average velocity of 1695 feet per minute at 72° F. of heated air at a fifth point displaced approximately 2 inches from said left wall of said machine and approximately 3.75 inches above said gridded support;

a computed average velocity of 1638 feet per minute at 72° F. of heated air at a sixth point displaced inwardly 1 inch from said left wall of said machine and approximately 5.75 inches above said gridded support.

5. An improved self-cleaning popcorn popping and vending machine as set forth in claim 1, in which the control means comprises:

a first electronic timing means for controlling said air blower and said heating element; said first electronic timing means electrically coupled to said air blower and said heating element;

a second electronic timing means for controlling said product motor controlled kernel dispensing device;

a third electronic timing means for controlling said topping dispenser and said gridded support, said third electronic timing means electrically coupled to said topping dispenser.

6. An improved self-cleaning popcorn popping and vending machine as set forth in claim 5, further comprising:

a safety means for sensing the temperature of said heater element and disconnecting said power source from said machine whenever a preselected temperature is exceeded.

7. An improved self-cleaning popcorn popping and vending machine as set forth in claim 6, further comprising:

a two-stage electronic control means for preheating said heating element at a first temperature and then changing said first temperature to a second temperature.

* * * * *